(12) United States Patent
Locklear

(10) Patent No.: US 7,174,668 B2
(45) Date of Patent: Feb. 13, 2007

(54) ELECTRICAL CONTROL DEVICE FOR MARINE ANIMALS

(76) Inventor: Dennis Locklear, 900 Erie St., Chesapeake, VA (US) 23322

(*) Notice: Subject to any disclaimer, the term of this patent is extended or adjusted under 35 U.S.C. 154(b) by 0 days.

(21) Appl. No.: 11/047,091

(22) Filed: Jan. 31, 2005

(65) Prior Publication Data

US 2006/0168872 A1 Aug. 3, 2006

(51) Int. Cl.
*H05C 1/04* (2006.01)
(52) U.S. Cl. .................. 43/17.1; 119/200; 119/220; 231/7
(58) Field of Classification Search ............. 43/17.1; 119/220, 200; 231/7; 361/232
See application file for complete search history.

(56) References Cited

U.S. PATENT DOCUMENTS

| | | | | |
|---|---|---|---|---|
| 1,158,473 A * | 11/1915 | Floyd | ............................ | 231/7 |
| 2,208,852 A * | 7/1940 | Mongan | ........................ | 231/7 |
| 3,362,711 A | 1/1968 | Larsen et al. | .............. | 463/47.3 |
| 3,484,665 A * | 12/1969 | Ormsby et al. | ............ | 361/232 |
| 3,626,626 A * | 12/1971 | Blanc | ................................ | 43/6 |
| 3,819,108 A * | 6/1974 | Jordan | .......................... | 231/7 |
| 3,917,268 A * | 11/1975 | Tingley et al. | ............. | 463/47.3 |
| 3,998,459 A * | 12/1976 | Henderson et al. | ........ | 463/47.3 |
| 4,367,843 A * | 1/1983 | Bros et al. | ..................... | 231/7 |
| 4,486,807 A * | 12/1984 | Yanez | ......................... | 361/232 |
| 4,667,431 A * | 5/1987 | Mendicino | ....................... | 43/6 |
| 5,467,247 A * | 11/1995 | de Anda et al. | ............ | 361/232 |
| 5,566,643 A * | 10/1996 | Charter et al. | .............. | 119/220 |
| 6,404,613 B1 * | 6/2002 | Dowling et al. | ............ | 361/232 |
| 6,791,816 B2 * | 9/2004 | Stethem | ....................... | 361/232 |
| 6,999,295 B2 * | 2/2006 | Watkins et al. | ............. | 361/232 |
| 2003/0165042 A1 * | 9/2003 | Stethem | ...................... | 361/232 |

* cited by examiner

*Primary Examiner*—Darren W. Ark
*Assistant Examiner*—John Holman
(74) *Attorney, Agent, or Firm*—David J. Bolduc

(57) ABSTRACT

A control device for marine animals comprises an electrical device that applies an electrical voltage directly to a marine animal in order to shock the marine animal, for control thereof. The device preferably comprises a pole or rod having electrical prongs at one end which my be applied to the marine animal, thereby applying and electrical signal having a voltage, amperage and frequency that stuns and/or shocks the animal. The character of the electrical signal is such that the animal is temporarily paralyzed, so that it may be safely handled by humans for bringing it into a watercraft without otherwise damaging the animal.

13 Claims, 7 Drawing Sheets

ELECTRICAL CONTROL DEVICE FOR MARINE ANIMALS

BACKGROUND OF THE INVENTION

1. Field of the Invention

The present invention relates to an electrical control device for marine animals. More specifically, the present invention comprises an electrical device, which applies an electrical voltage directly to a marine animal in order to shock the marine animal, for control thereof. The device preferably comprises a pole having electrical contacts at one end which my be applied to the marine animal, thereby applying and electrical signal having a voltage, amperage and frequency that stuns and/or shocks the animal. The character of the electrical signal is such that the animal is temporarily paralyzed, so that it may be safely handled by humans for bringing it into a watercraft without otherwise damaging the animal.

2. Description of the Prior Art

Fishing is a popular pastime. However, when attempting to land a large fish, additional equipment may be required to enable the angler to safely bring the fish into the boat or onto the bank or fishing platform. In the prior art the means most commonly used to bring a large fish into a boat is a gaff. A gaff consists of a handle having a "U" shaped member at one end. The end of the "U" shaped member is sharply pointed. Nets and gaffs are generally known in the prior art as means of controlling marine animals, and more specifically fish, for bringing them onboard watercraft during fishing operations. When using a gaff, the person assisting the fisherman must carefully place the point of the gaff into the fish at a location that will support the weight of the fish when lifted out of the water. Sufficient penetration of the point is also required. However, when a fish is gaffed it is typically seriously injured and should not be returned to the water.

Some common gaffs include: short, singled handed gaffs which consist of a small gaff hook and a short handle for single handed operation; two handed gaffs having a slightly larger head and a handle length between 3 and 5 feet; IGFA models for sport and game anglers subject to stringent IGFA regulations as to the overall size, weight and handle length of all gaffs and landing devices; extension handled models which are used with some very large and toothy fish wherein gaffs with extension handles are required to ensure that the catch does not get away, but not subject the angler to additional risk; rope or cliff gaffs for anglers fishing from high jetties, wharves and rock platforms or with tide movements of more than 8 meters, wherein the gaffs resemble a grapnel with a length of strong line to gaff to land very large fish from high vantage points; flying head gaffs that are specifically designed to assist in the landing of large sharks, wherein the head of the gaff is designed to come away from the handle, leaving a rope to be held by hand or secured via a cleat; and commercial tuna poles which are usually a long handled gaff, with a very strong, but flexible handle having greater strength than traditional aluminum or steel gaff handles.

Gaffing is one of the most important jobs in sport fishing, a task not to be taken lightly. For example, when standing by to gaff a record fish, or a winning fish in a competition or the catch of a lifetime, it is critical to prevent damage to the animal. Successful gaffing requires a strategy—The main objective is to control the fish, keeping it from thrashing wildly or spinning off the gaff and possibly injuring someone or damaging equipment. Preserving the quality of the fish's meat is equally important, since bad gaff placement can damage the flesh. There may be times when a quick gaff shot is necessary, such as when the fish is barely hooked, but even then it's best to take a bit of extra time to ensure the job is done correctly.

Typically, the gaff is set in the head, and the fish is quickly lifted straight into the boat. However, if intending to catch and return the fish, this method of gaffing is not desirable as it will cause injury to the fish. It is also difficult to gaff a fish if it's poorly hooked or if the fish is violently thrashing, creating the danger of the fish breaking off. Thus, in most cases it is necessary to tire the fish out before bringing it to the boat. This requires waiting until the fish has made a few more runs or dives and wears itself down to ensure that it will put up less of a struggle on the gaff.

Recently, "Catch and Release" of fish has been advocated because it ensures the future of angling, by returning the catch alive. If the goal is to return the fish alive it is best not to bring it into the boat and risk injury to the fish. However if photographs and estimated weight are required, then gaffing is required and becomes rather a delicate procedure requiring skill and patience. It also requires good placement of the gaff to avoid injury to the fish. Prior art devices for gaffing of a large fish in heavy or even rolling seas can easily injure a fish, so that it will not survive if later released. Even when the fish is not to be released, it is desirable to cause as little physical injury to the fish when gaffed.

Since gaffing a large fish is not intended to kill the fish, the fish continues to thrash about after being gaffed. Often, the thrashing by the fish and/or an insecure gaffing can cause the fish to fall off the gaff back into the water. This can and sometimes causes the fishing line to break, thus losing the fish after finally finding, hooking, and reeling the fish alongside of the boat.

Once a large fish is "safely" brought up out of the water and into a boat, other problems arise. Since the fish is alive and large, its natural survival instincts are to continue to thrash about which sometimes causes the fish to jump out of the boat back into the water. The thrashing fish can also be a danger to the people within the boat. It can cause chaos resulting in one or more of the fisherman being thrown overboard; it can cause physical injuries due to sharp teeth, sharp fins, sharp gills, and sharp scales. Obviously, a more satisfactory apparatus for controlling the fish would be beneficial.

Other means of controlling fish include self defense weapons such as shark darts having CO2 charged pointed spears. These spears piece the shark's skin and then explosively release CO2 gas inside the shark skin blowing them apart. Great amounts of blood are released into the water by this method. Thus, whether the shark lives or dies, the blood attracts other sharks and increases the peril to the diver. Bangsticks are touch sensitive shotgun shells mounted on sticks. Hitting a shark detonates the charge and repels the shark. However, the same problem of blood in the water results from this method. Further dangers from explosive tip devices exist due to accidental discharge. A bangstick doesn't know if it is a shark or your foot that has detonated it. Diving often involves climbing around rocking boats full of gear on the decks. Touch sensitive explosives are very hazardous for divers in these conditions.

In the prior art there exist a number of fishing lures, electric missile weapons, and repelling devices which rely on electric shock to control, immobilize or repel a fish. The electrical stimulus affects an animal's nervous system to the extent of chasing the animal away or killing it. Between these limits depending upon the make-up of the animal's nervous system, the amount of the electrical shock, and the point of contact any number of varying results can occur. Very brief reversible immobilization can occur, lengthy immobilization which may or may not be reversible can occur, or permanent non-reversible immobilization can occur. Similar devices used on land include cattle prods, dog training devices and human crowd control tazers. These devices are designed for mammals that are sensitive to high voltages such as 40,000 volts with low amperages in the milliamp range.

For example, U.S. Pat. No. 4,667,431 to Mendicino discloses a shark prod. A waterproof casing electrically insulates an electric power supply and circuitry to permit underwater operation of a fish repelling electrical prod. The prod includes a switching device telescopically mounted inside a tube with sliding, waterproof seals whereby upon impact with a fish, a pair of electrically conductive prongs are energized thus repelling the fish. This invention serves to debilitate a shark by two methods. The first is to surprise the shark and make him dart away. The second is to actually incapacitate the shark by numbing all of his electrical sensors. The shock stuns the ampulla of Lorenzini organs and overcharges the body's overall tolerance to electricity. Thus, this invention uses a high amperage, low voltage charge to debilitate a shark.

U.S. Pat. No. 5,732,501 to Ausburn discloses a gaff for electrically incapacitating fish. The gaff includes a handle and a hook. In a flying gaff, the hook is separable from the handle. In two embodiments, the gaff utilizes a piezoelectric sensor which when flexed by the weight of the fish produces a signal which activates a circuit which produces a stunning voltage across electrodes attached to the hook.

Another method of controlling fish is called electrofishing. In electrofishing, an electric current is passed through the water. Direct current electroshockers are used to cause the fish to swim towards the anode, and when the fish gets close, causes narcosis (a state of arrested activity induced by the use of electrical stimulation). It is usually done on foot with a backpack, portable shocker device or from a specially modified boat. For streams, side-channels, and shallow margins of a river, a portable backpack is used. The equipment for electrofishing includes a portable backpack, power supply, voltage and current regulator, cathode, anode, dip net, and bucket. The crew consists of at least two people, one person is the operator, while another person carries a dip net and a bucket to collect the fish once they have been stunned.

Electrofishing is dependent on certain parameters of the applied electric field including the conductivity/salinity of water, temperature, the material of the electrodes, and the source of electrical power. Other relevant factors include the depth of the water, and the size and type of fish to be stunned. Research has shown that direct current and impulse current are most effective. Direct current was most effective, but is primarily limited to use in low-conductivity freshwater. For salty water, DC devices would require the use of a large power supply. Thus, electrofishing is limited to use in catching fish for reproduction in streams, rivers, fisheries or shallow lithorial areas. Thus, it would be preferable to have a device for controlling fish that is not limited to shallow and/or fresh water usage.

Thus, the major problem with gaffs of the prior art is that they do not sufficiently control the fish in a manner to prevent damage and injury to the fish. Gaffs also do not provide a secure way of handling live fish, which is still in motion and which may be unintentionally released back into the water. Furthermore, when handling a live fish with a conventional gaff, the gaff handlers are also subjected to possible injury from the fish.

Another major problem with prior art fish control devices, including bang sticks and shark prods, is that they also cause damage to the fish. Furthermore, these devices can cause the fish to bleed, which may attract predators, thereby risking further injury to the fish. Furthermore, these shock or explosive devices may cause injury or death to the fisherman handling these devices.

Another major problem with prior art fish control devices, such as electrofishing gear, is that these devices are limited to shallow, fresh water use. Electrofishing is further limited to use with smaller fish. Furthermore, electrofishing gear typically requires at least two people working in conjunction to shock the fish and to catch or net the fish.

Thus, there exists a need for a device and method for controlling fish without risk of injury to the fish or fisherman. The current invention discloses such a device and method for its use.

SUMMARY OF THE INVENTION

According to the present invention, there is provided an electrical control device for incapacitating fish in order to bring the fish aboard a watercraft. The disclosed invention comprises a power supply and electrical circuitry for generating an electrical signal capable of temporarily or permanently disabling a fish for safe handling. The electrical circuitry is optionally able to modify the frequency, voltage, amperage and pulse width of the electrical signal to optimize the effect upon the fish to be controlled The electrical control device is preferably mounted in a rod which has anode and cathode prongs thereon for delivery of the electrical impulse directly to the flesh of the fish. Furthermore, in preferred embodiment of the invention the prongs are contained within a retractable sheath. The sheath retracts in response to pressing the sheath against a surface, only exposing the prongs when necessary, to prevent inadvertent injury and to prevent overload of the device. Furthermore, the device may include a power switch on the handle of the rod, and/or a power switch activated by retraction of the prong sheath.

It is therefor an object of the present invention to provide an electrical control device for incapacitating or immobilizing fish to ease in the handling thereof.

It is another object of the present invention to provide a device of the character described wherein the device controls the fish in a manner to prevent damage and injury to the fish.

It is another object of the present invention to provide a device of the character described wherein the device provides a secure way of handling live fish, which is still in motion.

It is another object of the present invention to provide a device of the character described wherein the device allows for control of the fish while preventing unintentional release of the fish back into the water.

It is another object of the present invention to provide a device of the character described wherein the device does not subject the fish handler possible injury from the fish.

It is another object of the present invention to provide a device of the character described wherein the device does not cause the fish to bleed, which may attract predators, thereby risking further injury to the fish.

It is another object of the present invention to provide a device of the character described wherein the device minimizes the risk of injury or death to the fisherman handling the devices.

It is another object of the present invention to provide a device of the character described wherein the device is not limited to shallow, fresh water use.

It is another object of the present invention to provide a device of the character described wherein the device is not limited to use with smaller fish.

It is another object of the present invention to provide a device of the character described wherein the device may be activated and controlled by one person.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DESCRIPTION OF THE PREFERRED EMBODIMENT

The present invention provides an electrical control device for temporarily or permanently incapacitating fish. The electrical control device is preferably embodied in a rod or pole, within which electrical control components are mounted for delivery of the incapacitating electrical signal.

Figure 1:
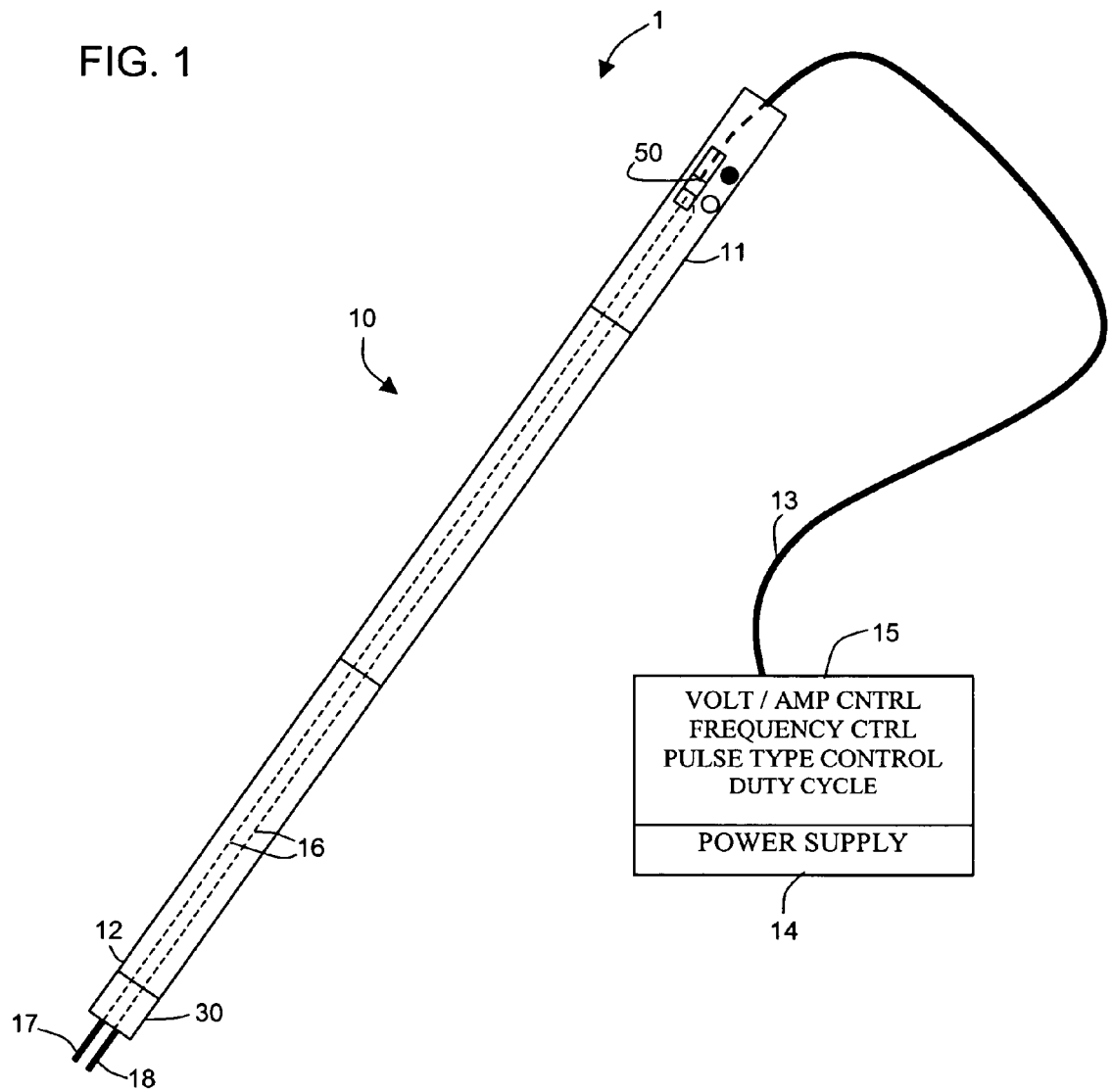
FIG. 1 is a perspective view of an electrical fish control device of the present invention.

Referring to FIG. 1: FIG. 1 schematically illustrates one embodiment of the electrical control device 1. In this embodiment the control device 1 comprises a rod 10 having a proximal handle portion 11 and a distal portion 12. A pair of electrical contacts comprising and anode prong 17 and a cathode prong 18, are insulatingly mounted onto distal portion 12 for delivery of the electrical impulse directly to the flesh of the fish. A power source 14 which may, for example, comprise one or more 9-volt batteries is connected via wires 13 to an electrical circuit 15, both of which are preferably but not necessarily mounted within the handle portion 11. The voltage source 14 may be as low as 3 volts or as high as 15 volts and my comprise a DC or rectified AC source. Conducting wires 16 are used to connect the electrical circuit 15 to anode prong 17 and cathode prong 18.

More specifically, the rod 10 preferably comprises a hollow cylindrical tube. The material of construction of the rod 10 preferably comprises a lightweight, durable material such as plastic or fiberglass and may have a diameter ranging from ½ to several inches and more preferably 1 to 2 inches.

The rod 10 is preferably hollow in order to accommodate electrical and other mechanical components of the device 1 therein. These components include as a minimum, electrical wiring 13, 16 connected between the power supply 14 and the anode and cathode prongs 17, 18. Additional components that may be included within the hollow tube include batteries for use as the power source 14, as well as the electrical circuit 15 for modifying the signal from the power source 14. Furthermore, wiring between one or more switches 50, 60 (described herein below) may be mounted on the proximal 11 or distal 12 portions of the rod 10 between the power supply 14, electrical circuit 15 and/or anode and cathode prongs 17, 18. The cylindrical tube 10 preferably also contains buoyant material 29, such as foam plastic therein in order to provide floatation to the control device 1 should it fall into the water. Most preferably, the rod 10 is lightweight, moisture impermeable/waterproof, and buoyant in order to accommodate its use in and around water. Buoyant materials of construction prevent the device 1 from sinking in water if it is inadvertently dropped in water, and to aid in retrieval of the device 1. The device 1 is also water proof to prevent the electrical circuitry 15 and other electrical components 14, 13, 16 from getting damaged and short-circuiting the device 1.

The proximal end 11 of the rod 10 comprises the handle portion 11 that may have a non-skid gripping material such as rubber, and may further comprise recessed grooves to conform to the gripping thereof with the fingers. The distal end 12 of the rod 10 is where the anode prong 17 and cathode prong 18 are mounted. More specifically, the distal end 12 of the rod 10 is preferably closed in order to be watertight so that water does not enter the interior of the rod 10. The prongs 17, 18 extend through the closed distal end 12 of the rod 10 so that a portion of the prongs 17, 18 are exterior to the distal end 12 of the rod 10 and are connected within the watertight portion of the rod 10 with wires 13, 16 to the power source 14 and/or electrical circuit 15. The prongs 17, 18 may be 1/32 inch to 1/8 inch in diameter and preferably extend past the distal end 12 from 1/8 inch to 2 inches, and most preferably ½ inch in order to provide sufficient exposure to establish and maintain contact with the fish to be disabled.

Figure 2:
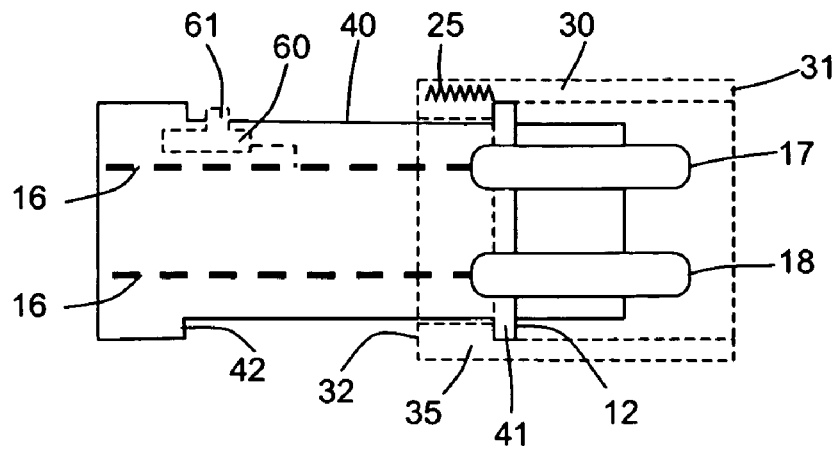
FIG. 2 is an elevation view of the distal end of the electrical fish control device showing the prongs and retractable sheath in the closed position.
Figure 3:
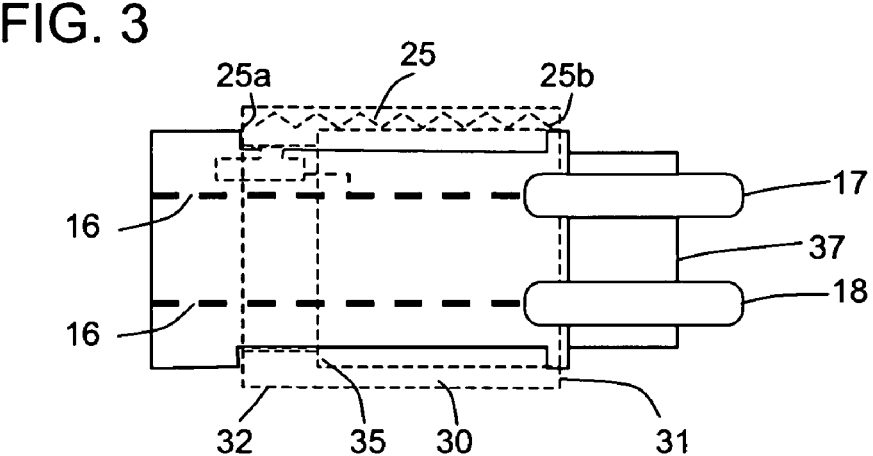
FIG. 3 is an elevation view of the distal end of the electrical fish control device in FIG. 2 showing the prongs and retractable sheath in the retracted position.
Figure 4:
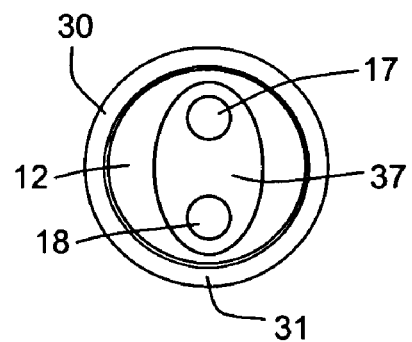
FIG. 4 plan view of the distal end of the electrical fish control device in FIG. 2 showing the prongs and retractable sheath.

Referring to FIG. 2–3: In the preferred embodiment of the invention the prongs 17, 18 are contained within a retractable sheath 30 having proximal 32 and distal ends 31. The sheath 30 retracts in response to pressing the distal end 31 of the sheath 30 against a surface, such as the flesh of the fish, only exposing the prongs 17, 18 when desired. Keeping the prongs 17, 18 enclosed within the sheath 30 serves to prevent inadvertent contact with the prongs 17, 18 and concomitant injury to persons and/or overload of the device.

The sheath 30 comprises a hollow tubular member which fits on and is retractably retained on the distal end 12 of the rod 10. The material of construction of the sheath 30 is preferably similar to that of the material of the rod 10, that is a lightweight, durable, insulating material such as plastic or fiberglass. To facilitate retractable retention of the sheath 30 on the rod 10, the distal end 12 of the rod 10 has a recess 40 therein forming a lip 41 between the end of the recess 40 adjacent the distal end 12 of the rod, and a stop 42 at the end of the recess closer to the proximal end 11 of the rod. The recess 40 is an area of the distal end 12 of the rod having a smaller outer diameter than the remainder of the distal end of the rod 10, i.e., a smaller diameter than the lip 41 and the stop 42.

The sheath 30 cooperates with the recess 40 for retractable retention thereof by means of a sheath lip 35 on the proximal end 32 of the sheath. The inner diameter of the sheath 30 is substantially the same and preferably slightly larger than the outer diameter of the lip 41 on the distal end 12 of the rod 10, thereby allowing the sheath 30 to retract, sliding around the lip 41. The sheath lip 35 has an inner diameter that is substantially the same and preferably slightly larger than the outer diameter of the recess 40, thereby allowing the lip 35 to retract, sliding around the recess 40. The lip 35 of the sheath 30 can be positioned anywhere between the lip 41 and the stop 42, which because of their larger diameters prevent the sheath lip 35 from moving beyond the recess 40. When the sheath lip 35 rests against the distal lip 41 of the rod, the prongs 17, 18 are completely contained within the sheath 30, and when the sheath lip 35 rests against the stop 42, the sheath 30 surrounds the distal end 12 and lip 41, thereby exposing the prongs 17, 18.

The sheath 30 is preferably spring-loaded 25 so that in its normal extended state it rests over the prongs 17, 18 and against the sheath lip 41. When the sheath 30 is pressed against a surface it retracts as far as the stop 42, exposing the prongs 17, 18 and placing the spring 25 in tension or compression, depending on the type of spring 25, which may include a helical or coiled spring (compression or extension), clock spring, leaf spring, or torsion spring. When the distal end 31 of the sheath 30 is removed from a surface, the spring 25 returns the sheath 30 to its normal extended state over the prongs 17, 18. The spring has two ends 25a, 25b respectively connecting the sheath 30 to the distal end 12 of the rod 10.

Referring again to FIG. 1: The disclosed invention comprises a power supply 14 connected wires 16 to electrical circuitry 15 for generating an electrical signal capable of temporarily or permanently disabling a fish for safe handling via wires 13 to prongs 17, 18. The electrical circuitry 15 is preferably adapted to modify the electrical signal from the power supply 14 to an electrical signal with a frequency, voltage, amperage and pulse width optimized to disable the fish to be controlled.

The device 1 preferably also includes a power switch 50 in proximity to the handle in the proximal portion 11 of the rod 10. The switch 50 is located along the wires 16 between the power supply 14 and the electrical circuit 15 in order to isolate power from the circuit 15 until it is desired. Wires 13 electrically connect the electrical circuit 15 to the anode and cathode prongs 17, 18.

Referring again to FIGS. 2–3: The device 1 preferably also includes a microswitch 60 in recess 40 at the distal portion 12 of the rod 10, which is activated by retraction of the sheath 30. The microswitch 60 is located on the wires 13 between the electrical circuit 15 to the anode and cathode prongs 17, 18 on the interior portion of the distal end 12 of the rod 10. The microswitch 60 also has a depressible button 61 that extends into the recess 40 and is depressible by contact with the proximal end 32 of the sheath 30 when the sheath 30 is retracted.

The prongs 17, 18 extend beyond the distal end 12 of the rod 10 and are separated by at least one half inch and up to several inches. It is preferred that a discharge occur between the tips of the prongs 17, 18 and into the marine animal to be controlled. To prevent discharge across the space between the prongs 17, 18, i.e., the portions before the tip, an insulating case 37 such as rubber or plastic case may be situated around and between the prongs 17, 18. The insulating case 37 also strengthens the prongs 17, 18 to prevent them from bending or snapping off from the distal end 12 of the rod.

Figure 5:
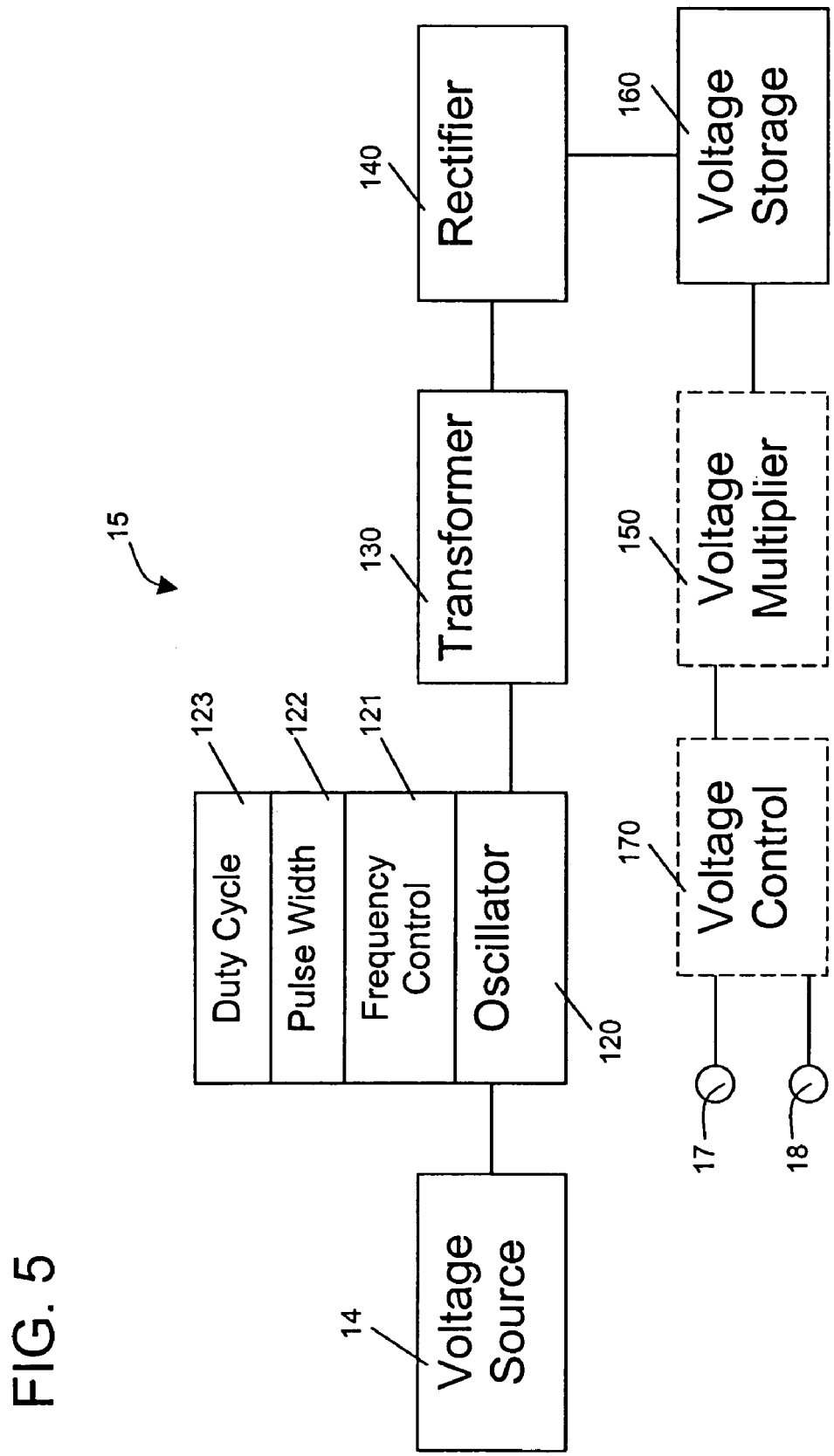
FIG. 5 is block diagram showing the components of an exemplary circuit for use in the present invention FIG. 6 an electrical schematic of a simple exemplary circuit for use in the present invention.

Referring to FIG. 5: The simplified electrical circuit 15 shown in FIG. 5 may be used in conjunction with the apparatus of FIGS. 1 through 4. The representative electrical circuit 15 of FIG. 5 is used to develop the electrical potential for imparting the electrical shock to a fish coming in contact with prongs 17, 18. The electronic circuit 15 consists of a power supply 14 electrically connected to an oscillator 120 and further coupled to the prongs 17, 18 through one or more energy multiplier sections 130, 150. This circuitry 15 is conceptually similar to an automobile ignition system. The circuit parameters are altered to achieve a psychologically and physiologically effective discharge while maintaining non-lethality. The circuitry develops a voltage potential between 300 volts and 50,000 volts (and most preferably between 10,000 volts and 30,000 volts) and is preferably selectable between a range of those values by alteration of circuit components and preferably the values of the potentiometers or capacitors through which the electrical signal passes to the prongs 17, 18. The frequency of the electrical signal is preferably between 15 Hz and 60 Hz, but may be as high as 1000 Hz. Most preferably the frequency of the applied signal is selectable between 20 and 50 Hz by alteration of circuit components and preferably the values of the potentiometers or capacitors through which the electrical signal passes to the prongs 17, 18. Similarly the alteration of the values of the potentiometers or can alter the pulse width of the electrical signal between 1 millisecond and 1 second, and preferably 200–500 milliseconds. Also similarly the duty cycle can selectably range from 10–85% by varying the values of those circuit components.

Figure 8:
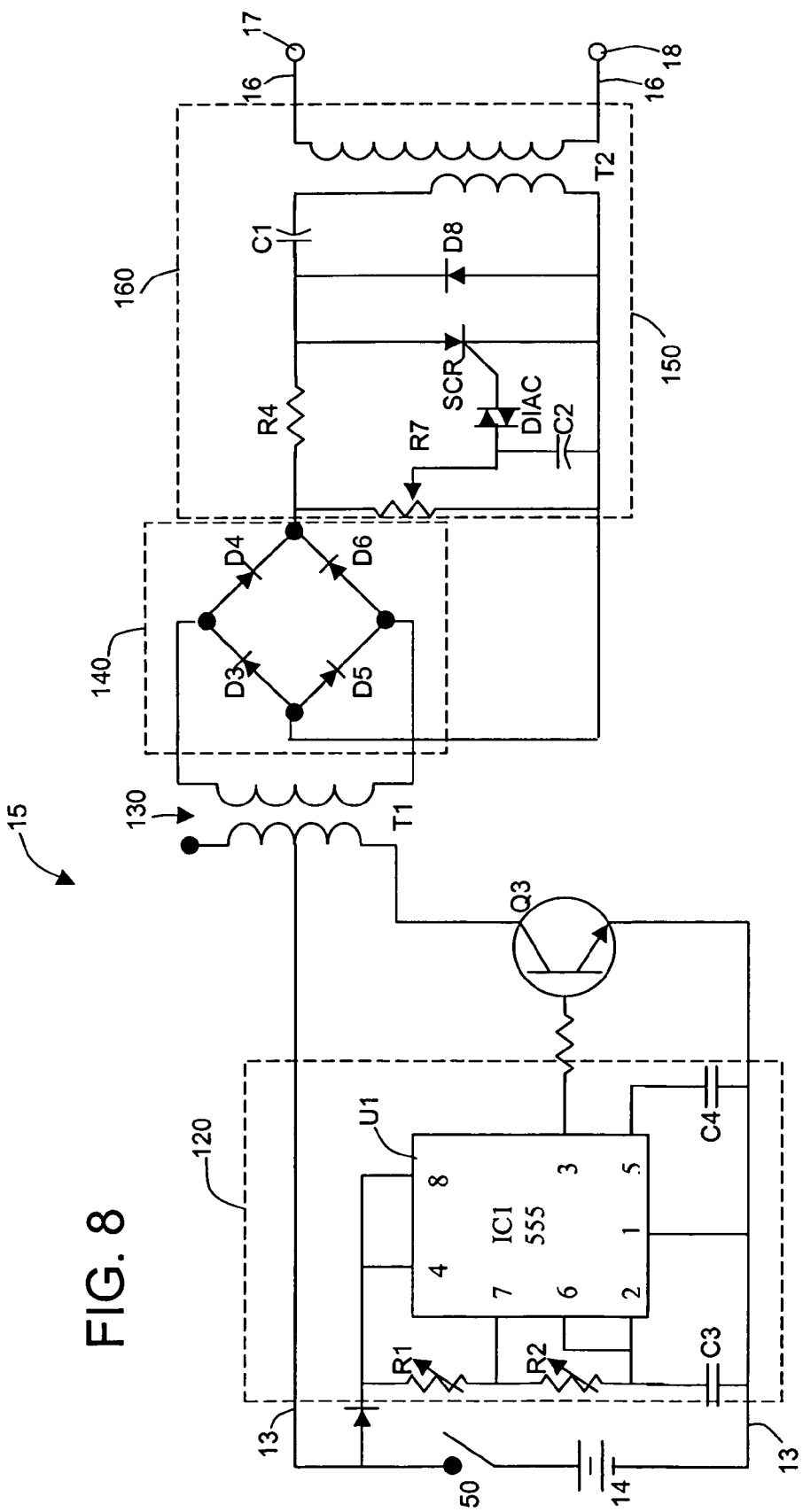
FIG. 8 is an electrical schematic of another alternate exemplary circuit for use in the present invention.
Figure 9:
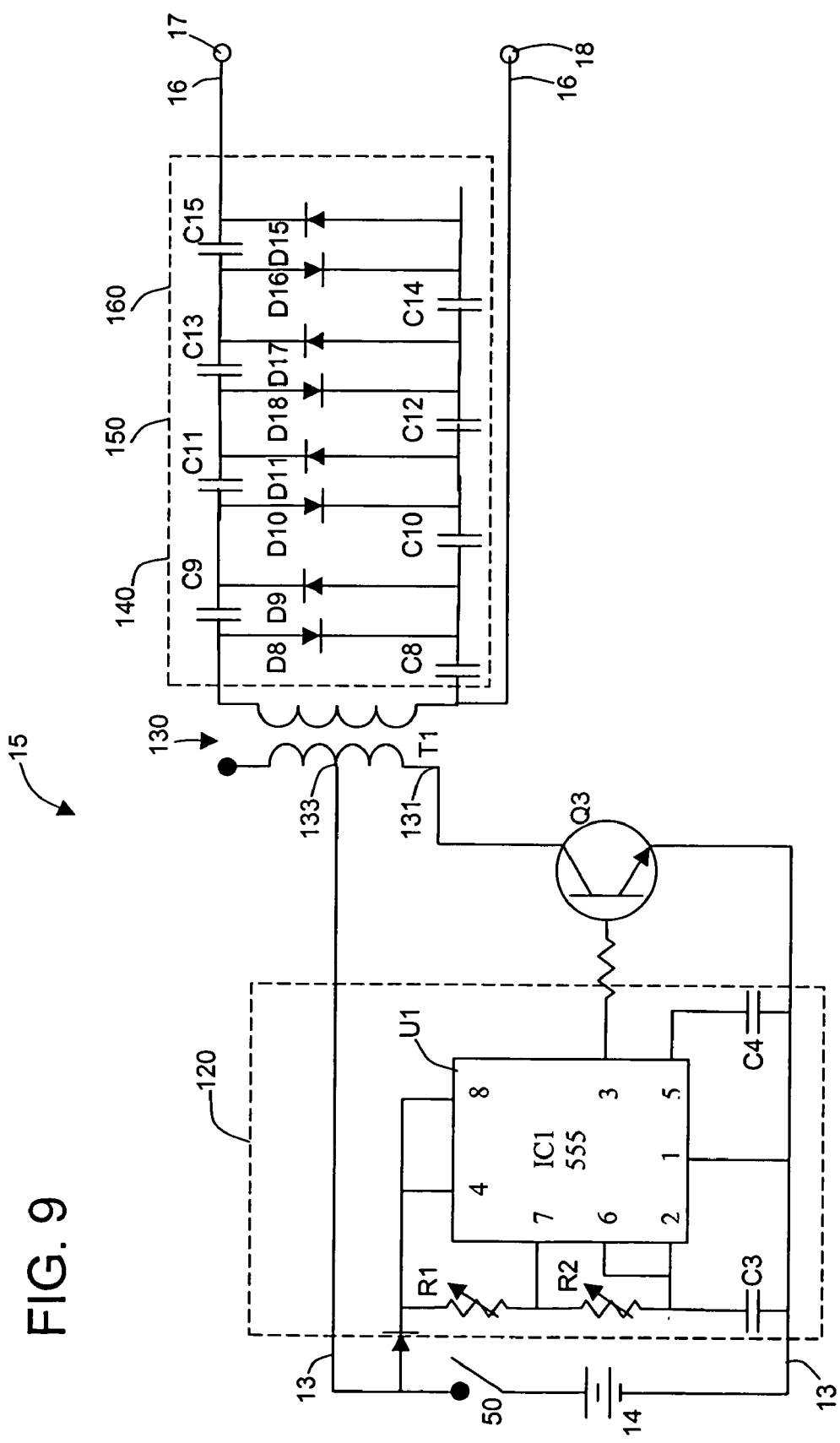
FIG. 9 is an electrical schematic of yet another alternate exemplary circuit for use in the present invention.

The oscillator portion 120 may be represented in a variety of circuit configurations. In the schematic diagram of FIGS. 6 and 7, two power transistors Q1 and Q2, form a regenerative amplifier, i.e., monostable multivibrator, operating as a power oscillator 120. When Q1 turns on and Q2 turns off, electrical energy from the power supply 14 is stored in the primary of the transformer T1. When Q2 turns on, Q1 turns off which shorts the power supply 14 across the primary of the transformer T1 that forms the first voltage multiplier portion 130. The current pulse induces a high voltage in the secondary of T1. In the schematic of FIGS. 8 and 9, the oscillator is a monostable multivibrator using a 555 timer U1 working in conjunction with transistor Q3. The timer U1 turns Q3 off and on, which alternately stores a charge in the primary of the transformer T1 and then discharges it. The current pulse in the primary of T1 induces a high voltage in the secondary of T1. As each regenerative oscillator 120 continues operation, Q1 or Q3 alternately turns on and off again and the cycle repeats itself. Therefore, a rapid series of DC pulses are generated and stepped up by T1 to at least 300 volts and up to 1000 volts at full battery charge.

Figure 6:
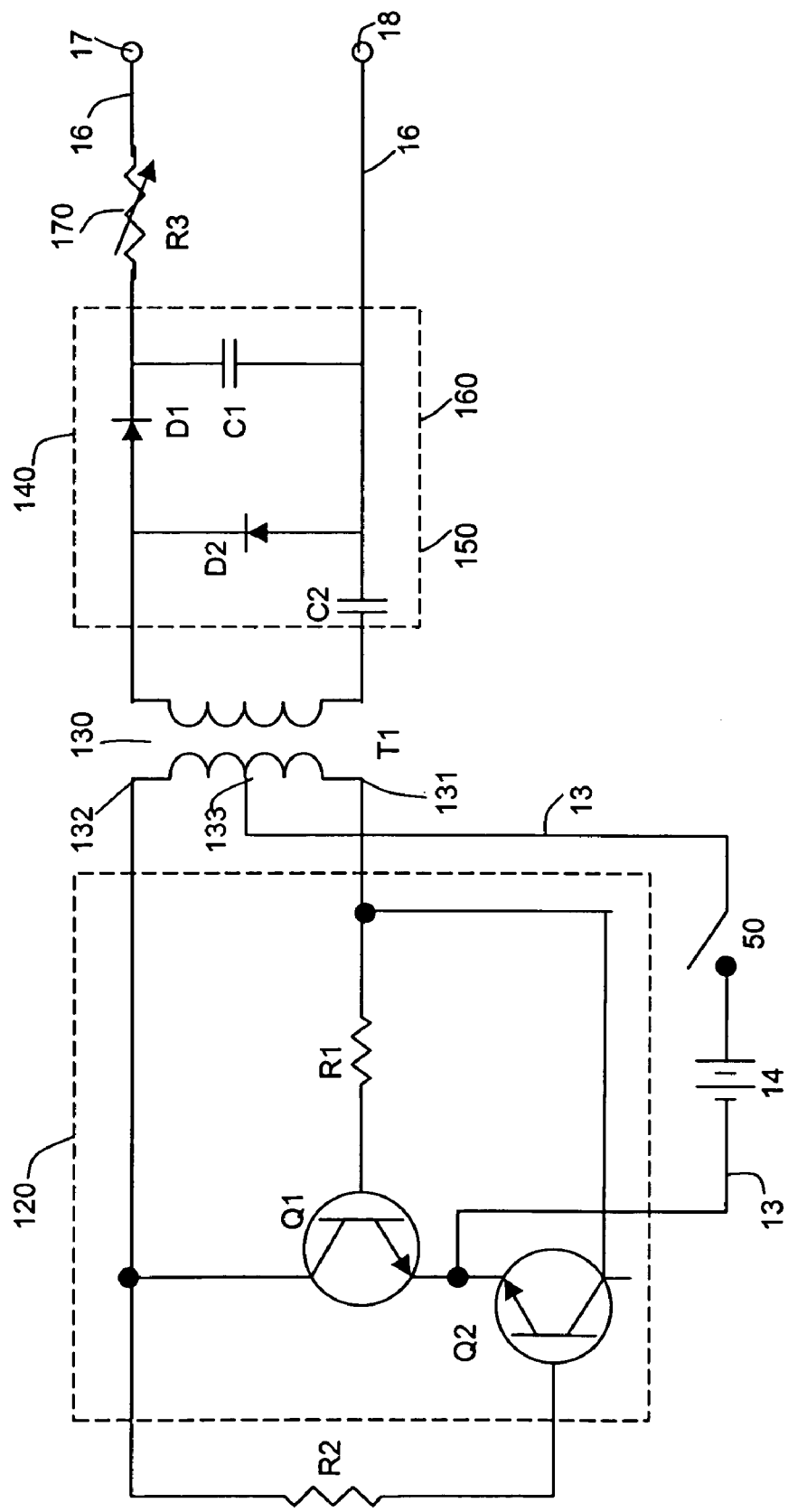

Referring again to FIGS. 6–9. Each oscillator 120 may also contain circuit components to control the duty cycle 123, pulse width 122 and frequency 121 of the on/off square wave output of the oscillator 120. In the circuit of FIG. 6, the bases of the transistors Q1, Q2, and the positive terminal of the power supply 14 (through switch 50) are connected to a center-tapped transformer T1. More specifically the base of transistor Q1 is connected to one end tap 131 of the transformer T1 primary through resistor R1, and the base of the other transistor Q2 is connected to the opposite end tap 132 throgh resistor R2, while the power supply is connected to the center tap 133. The collector of Q1 is connected between R2 and end tap 132, and the collector of Q2 is connected between R1 and end tap 132. The negative terminal of the power supply 14 is connected to the emitters of the transistors Q1, Q2. Alternately, the emitters may be grounded. The frequency and the on/off duty cycle of the transistor pair Q1, Q2 is controlled by the values of the resistors R1 and R2 connected to respective bases of the transistors Q1 and Q2 as well as the inductive reactance of the primary of the transformer T1. With all values equal, the circuit has a 50% duty cycle, with equal on and off times switched between Q1 and Q2.

Figure 7:
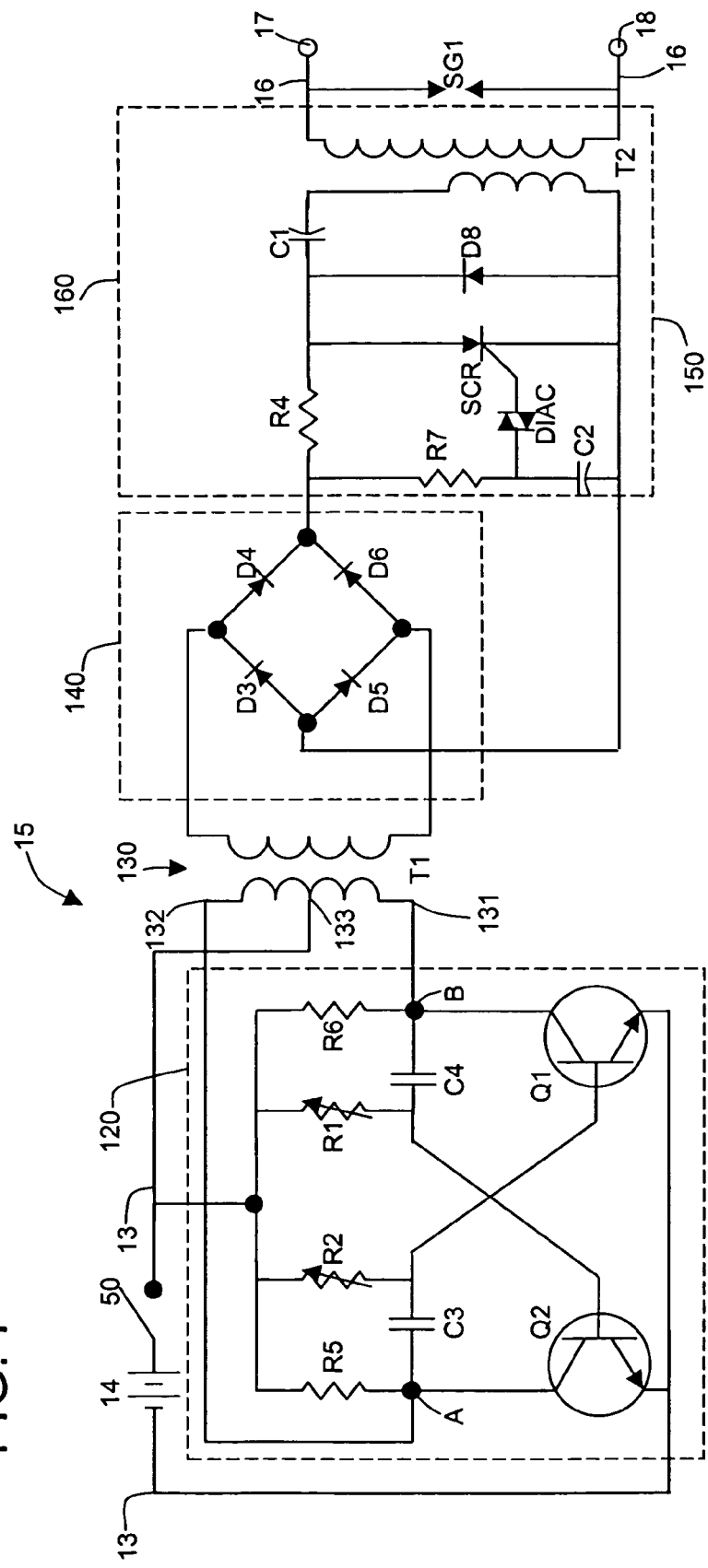
FIG. 7 is an electrical schematic of an alternate exemplary circuit for use in the present invention.

Referring to the circuit of FIG. 7: In the circuit of FIG. 7, the circuit contains a transistor pair Q1, Q2 connected to the power supply 14 and center-tapped transformer T1 in a similar manner to that in FIG. 6, with the addition of capacitors C3, C4 and resistors R5, R6 to provide additional timing and frequency functions 121, 122, 123. The emitters of Q1 and Q2 may be grounded or connected to the negative terminal of the power supply 14. The power supply 14 positive terminal is connected though switch 50 to the center tap 133. The base of Q1 is connected to end tap 131 and the collector of Q2 through capacitor C3, and the base of Q2 is connected to end tap 132 and the collector of Q1 through capacitor C4. The positive terminal of the power supply 14 is connected through parallel resistors R2, R6 to the collector of Q1 and the base of Q2 respectively on each side of capacitor C4. The positive terminal of the power supply 14 is also connected through parallel resistors R1, R5 to the collector of Q2 and the base of Q1 respectively on each side of capacitor C3.

In operation, Q1 saturates and Q2 is in cutoff when the circuit is symmetrical; that is, R1=R2, R5=R6, C3=C4, and Q1=Q2. Essentially, all the current in the circuit flows through Q2 and Q2 offers almost no resistance to current flow while capacitor C3 is charging. Since Q2 offers almost no resistance in its saturated state, the rate of charge of C3 depends only on the time constant of R1 and C3 (TC=R1C3). The right-hand side of capacitor C3 is connected to the base of transistor Q1, which is at cutoff while the right-hand side of capacitor C3 becomes increasingly positive. If the base of Q1 becomes sufficiently positive, Q1 will conduct. After a certain period of time, the base of Q1 will become sufficiently positive to cause Q1 to change states from cutoff to conduction. The time necessary for Q1 to become saturated is determined by the time constant R1C3. As Q1 starts conducting and quickly saturates, and the voltage at output A changes from approximately 0 volts to approximately V (battery). This change in voltage is coupled through C4 to the base of Q2, forcing Q2 to cutoff. Now Q2 is in cutoff and Q1 is in saturation.

The left side of capacitor C4 becomes more positive at a rate determined by the time constant R2C4. As the left side of C4 becomes more positive, the base of Q2 also becomes more positive. When the base of Q2 becomes positive enough to allow Q2 to conduct, Q2 will again go into saturation. The resulting change in voltage at output B will cause Q1 to return to the cutoff state. The output voltage (from either output A, B of the multivibrator) alternates from approximately 0 volts to approximately V (battery), remaining in each state for a definite period of time. The time may range from a microsecond to as much as a second or two. In some applications, the time period of higher voltage (VCC) and the time period of lower voltage (0 volts) will be equal. Other applications require differing higher- and lower-voltage times. For example, timing and gating circuits often have different pulse widths. The value of the pulse widths is a function of the time constants R1C3 and R2C4, and the frequency is the reciprocal of the two time constants 1/(R1C3+R2C4). The duty cycle (time on) of Q2 is equal to the pulse width of Q2 on time divided by the frequency R1C3/(R1C3+R2C4). Thus by varying the value of the capacitance or of the resistors, one can control the pulse width, frequency and duty cycle of the oscillator 120. Resistors R1, and R2 are preferably variable in order to affect the desired pulse width, frequency and duty cycle.

Referring to FIGS. 8 and 9: The oscillator portion of these circuits comprises a monostable multivibrator using a 555 timer U1 working in conjunction with transistor Q3. The timer U1 generates a square wave output which turns Q3 on and off, which alternately stores a charge in the primary of the transformer T1 and then discharges it. The current pulse in the primary of T1 induces a high voltage in the secondary of T1. The character of the square wave is controlled by the circuit components attached to the pins of the timer U1.

The 555 timer U1 has a number of pins for connection of electrical circuit components to timer's U1 internal IC containing various comparators and transistors. Pin 1 is the ground (or common) pin and is the most-negative supply potential of the device, which is normally connected to circuit common (ground) when operated from positive supply voltages. Pin 2 is the trigger pin and is the input to the lower comparator and is used to set the latch, which in turn causes the output to go high. This is the beginning of the timing sequence in monostable operation. Pin 3 is the output pin of the 555 timer U1 and comes from a high-current totem-pole stage made up of several transistors. Pin 4 is the reset pin and is also used to reset the latch and return the output to a low state. Pin 5 is the control voltage pin and allows direct access to the ⅔ V+ voltage-divider point, the reference level for the upper comparator and also indirect access to the lower comparator. Pin 6 (threshold) is one input to the upper comparator (the other being pin 5) and is used to reset the latch, which causes the output to go low. Pin 7 is the discharge pin which is connected to the open collector of a npn transistor within the timer U1, the emitter of which goes to ground, so that when the transistor is turned "on", pin 7 is effectively shorted to ground. Usually the timing capacitor is connected between pin 7 and ground and is discharged when the transistor turns "on". The conduction state of this transistor is identical in timing to that of the output stage, this transistor switch being used to clamp the appropriate nodes of the timing network to ground. Pin 8 is the V+ pin (also referred to as Vcc) and is the positive supply voltage terminal of the 555 timer IC. Supply-voltage operating range for the 555 is +4.5 volts (minimum) to +16 volts (maximum), and it is specified for operation between +5 volts and +15 volts.

FIGS. 8–9 show the 555 timer U1 connected as an astable multivibrator. Both the trigger and threshold inputs (pins 2 and 6) to the two comparators are connected together and to an external capacitor C3. The capacitor C3 charges toward the supply voltage through the two variable resistors, R1 and R2. The discharge pin (7) connected to the internal transistor is connected to the junction of those two resistors R1, R2.

When power is first applied to the circuit, the capacitor C3 will be uncharged, therefore, both the trigger and threshold inputs will be near zero volts. The lower comparator sets the control flip-flop causing the output to switch high. That also turns off the internal transistor. That allows the capacitor C3 to begin charging through R1 and R2. As soon as the charge on the capacitor C3 reaches ⅔ of the supply voltage, the upper comparator will trigger causing the flip-flop to reset. That causes the output to switch low. The internal transistor also conducts, the effect of which causes resistor R2 to be connected across the external capacitor C3. Resistor R2 is effectively connected to ground through internal transistor. The result of that is that the capacitor C3 now begins to discharge through R2. As soon as the voltage across the capacitor C3 reaches ⅓ of the supply voltage, the lower comparator is triggered. That again causes the control flip-flop to set and the output to go high. The internal transistor cuts off and again the capacitor C3 begins to charge. That cycle continues to repeat with the capacitor C3 alternately charging and discharging, as the comparators cause the flip-flop to be repeatedly set and reset.

The frequency of operation of the astable circuit is dependent upon the values of R1, R2, and C3. The frequency can be calculated with the formula f=1/(0.693C3(R1+2R2)). The Frequency f is in Hz, R1 and R2 are in ohms, and C3 is in farads. The time duration between pulses is known as the 'period', and usually designated with a 't'. The pulse is on for t1 seconds, then off for t2 seconds. The total period (t) is t1+t2. That time interval is related to the frequency by the familiar relationship: f=1/t or t=1/f. The time intervals for the on and off portions of the output depend upon the values of R1 and R2. The ratio of the time duration when the output pulse is high to the total period is known as the duty-cycle. The duty-cycle can be calculated with the formula: D=t1/t=(R1+R2)/(R1+2R2). The t1 and t2 times are as follows: t1=0.693(R1+R2)C3; and t2=0.693(R2C3). The 555, when connected as shown in FIGS. 8 and 9 can produce duty-cycles in the range of approximately 55 to 95%. A duty-cycle of 80% means that the output pulse is on or high for 80% of the total period. The duty-cycle can be adjusted by varying the values of R1 and R2, which are shown as potentiometers/variable resistors R1, R2.

The output of the timer U1 is a continuous stream of rectangular pulses. Which are applied to the gate of transistor Q3. The transistor Q3 is therefore alternately non-conducting, allowing the primary of transformer T1 to charge, and then conducting allowing the primary of the transformer T1 to discharge to ground, thereby inducing a high voltage pulse in the secondary of the transformer T1.

Each of the oscillator circuits 120 is connected to the primary of a transformer T1 which forms a voltage multiplier portion 130 with the transformer T1 secondary. In the circuits of FIGS. 6 and 7, T1 has a center-tapped primary, with two end taps 131, 132 and a center tap 133. The outputs A, B of the oscillator portion 120 are connected to the respective end taps 131, 132 of the transformer T1 and the center tap is connected to the voltage source 14 through switch 50. Thus when the switch 50 is closed the power source 14 is connected to the center tap 133 of the transformer T1 and alternately stores and then discharges electrical energy between the center tap 133 and each end tap 131, 132, depending on which transistor Q1, Q2 is conducting. In the circuits of FIGS. 8 and 9, T1 has a center-tapped primary, with two end taps 131, 132 and a center tap 133. The output of the timer U1 is connected through transistor Q3 to one of the end taps 131, 132 of the transformer T1 and the center tap is connected to the voltage source 14 through switch 50. Thus when the switch 50 is closed the power source 14 is connected to the center tap 133 of the transformer T1 and the primary alternately stores electrical energy between the center tap 133 and each end tap 131, 132 when Q3 is not conducting and discharges through Q3 when Q3 is conducting.

Referring again to FIGS. 6–9: The alternate charging and discharging of the transformer primary creates a series of higher voltage pulses in the secondary of the transformer T1. That voltage is rectified (by rectifier 140, which may comprise a single diode, diode array, a half bridge rectifier or a full bridge rectifier). A full bridge rectifier 140 comprising four diodes D3, D4, D5 and D6 is shown in FIGS. 7 and 8.

A half-bridge rectifier 140 comprising a pair of diodes D1, D2 is shown in FIG. 6. The rectifier 140 works in conjunction with capacitors C1 and C2 as voltage storage 160 and is configured as a half-wave voltage doubler 150. A capacitor-diode array shown in FIG. 9 comprising capacitors C8–15 and diodes D8–15 functions as a rectifier 140, as well as a voltage energy storage means 160 via the capacitors C8–15 and a second voltage multiplier 150, as a half wave voltage multiplier 150, multiplying the voltage by the number of diodes/capacitors (n=7). Additional capacitor diode pairs may be added, e.g., up to n=100 or more to multiply the voltage by n. The anode prong 17 is connected by wire 16 to the last capacitor C8 (or Cn) and the cathode prong 18 is connected between the secondary of the transformer T1 and the first capacitor C1 of the voltage multiplier 150.

Referring again to FIGS. 6–9: Each circuit also contains at least one voltage storage device 160, i.e., capacitor C1 and/or C2. The high-energy pulses in the secondary of the transformer T1 charge capacitors C1 and C2 through the rectifier portion 140 and/or diodes/voltage multiplier 150 for storage of electrical energy. This stored electrical energy may be discharge directly between the anode 17 and cathode prongs 18 or may discharge pulses of energy into an additional voltage multiplier portion, e.g., transformer T2.

In FIGS. 7 and 8, the rectified output of the full-bridge rectifier 140 is stored in capacitors C1 and C2 (through resistors R4 and R7 respectively). The output of the rectifier 140 is connected through series connection of R4 and C1 to one end of the transformer T2 primary, and through the series connection of R7 and C2 to the opposite end of the transformer T2 primary. The SCR anode is connected between R4 and C1 and the cathode is connected between C2 and the opposite end of the transformer T2 primary. The DIAC is between the SCR gate and the junction of C2 and R7. Capacitors C1 and C2 are charged by R4 and R7. As soon as the voltage across C2 reaches the DIAC's breakdown voltage, for example, 600 volts, the SCR starts conducting allowing C1 and C2 to discharge quickly, sending an electrical pulse across the primary of T2. The SCR will remain turned on until the main voltage becomes 0V, i.e., when the capacitors C1 and C2 are fully discharged. The SCR and DIAC stop conducting allowing capacitors C1 and C2 to store charge up to the breakdown voltage of the DIAC. The cycle continues of storge and breakdown, creating a series of high voltage pulses across the primary of T2, creating even high voltage pulses in the secondary of T2 for creating an extremely high voltage across the anode, cathode pair 17, 18. In the circuit of FIG. 8, R7 comprises a variable resistor which can be adjusted to vary the frequency of the high voltage discharges according to the time constant R7C2. The larger the value of R7, the longer it takes before the voltage across the capacitor is high enough to make the DIAC and SCR turn on, and therefore the lower the frequency of the pulses.

The rectified output voltage may be further increased using a voltage multiplier section which consists of an additional transformer T2 or with a voltage multipliers such as a capacitor-diode array C2 and C9, and D1 to D8. The final output is approximately 2000–30,000 volts. The use of a commercial spark gap SG1 between the anode and cathode 17, 18 prevents erosion and failure if used for extended periods of time. In the circuit of FIG. 6, a variable resistor R3 may be used as a voltage controller 170 to vary the voltage between the anode 17 and cathode 18.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the scope of the breadth and scope of the claims here appended.

I claim:

1. A marine animal control device comprising:
   a hollow, tubular, watertight, buoyant rod having a proximal handle end and a closed distal end;
   first and second electrical prongs extending from the interior to the exterior of said rod through said closed distal end;
   a retractable, hollow, tubular sheath slidably mounted to said distal end of said rod;
   said sheath having a first non-retracted position wherein said first and second prongs are within said hollow tubular sheath;
   said sheath having a second retracted position wherein said first and second prongs are at least partially exterior to said hollow tubular sheath;
   wherein said retractable sheath is spring loaded to maintain said sheath in said first position when said sheath is not acted upon by an outside force, and to return said sheath to said first position from said second position upon release of said outside force;
   and wherein said spring loading is provided by a spring connected between said sheath and said distal end of said rod, said spring being selected from the group consisting of a compression coil spring, an extension coil spring, a clock spring, a torsion spring and a leaf spring;
   a power supply having a positive terminal electrically connected to said first prong and a negative terminal electrically connected to said second prong;
   a voltage multiplier circuit connected between said power supply and said first and second prongs;
   a first power switch electrically connected between said power supply and said voltage multiplier circuit to connect or isolate said power supply from an input side of said voltage multiplier circuit; and
   a second power switch electrically connected between said first prong or said second prong and an output side of said voltage multiplier circuit to connect or isolate said output side of said voltage multiplier circuit from said first prong or said second prong.

2. The control device according to claim 1:
   wherein said second power switch isolates said output side of said voltage multiplier circuit from said first prong or said second prong when said sheath is in said first position;
   and wherein said second power switch connects said output side of said voltage multiplier circuit to said first prong or said second prong when said sheath is in said second position.

3. The control device according to claim 1, wherein said voltage multiplier circuit comprises:
   an oscillator subcircuit having an output side having a square wave output voltage;
   a first transformer having a primary winding and a secondary winding;
   said primary winding being connected to said output side of said oscillator subcircuit;
   a rectifier having an input side connected to said secondary winding of said first transformer;
   voltage storage means electrically connected between an output side of said rectifier and said first prong or said second prong.

4. The control device according to claim 3:
   wherein said oscillator subcircuit comprises an astable multivibrator subcircuit.

5. The control device according to claim 3, further comprising:
   a second transformer having a primary winding electrically connected to said voltage storage means and a secondary winding electrically connected to said first prong or said second prong.

6. The control device according to claim 3, wherein said voltage multiplier circuit further comprises:
   means for adjusting an output voltage between said first prong and said second prong.

7. The control device according to claim 3, wherein said voltage multiplier circuit further comprises:
   an astable multivibrator subcircuit having an output adjustable in voltage, frequency, pulse width or duty cycle.

8. The control device according to claim 3, wherein said voltage multiplier circuit further comprises:
   a diode-capacitor array electrically connected between said output side of said rectifier and said first prong or said second prong.

9. The control device according to claim 3:
   wherein said voltage multiplier circuit is adapted to generate an output voltage of 300 volts to 3,000 volts between said first prong and second prong.

10. The control device according to claim 3:
    wherein said voltage multiplier circuit is adapted to generate an output voltage having a frequency selectable between 15 Hz and 60 Hz.

11. The control device according to claim 5:
    wherein said voltage multiplier circuit is adapted to generate an output voltage of 10,000 volts to 50,000 volts between said first prong and second prong.

12. The control device according to claim 5, wherein said voltage multiplier circuit further comprises:
    a first series connected resistor-capacitor pair electrically connected between said output side of said rectifier and a first end of said primary winding of said second transformer;
    a second series connected resistor-capacitor pair electrically connected between said output side of said rectifier and a second end of said primary winding of said second transformer;
    an SCR having an anode electrically connected between a junction of said first resistor capacitor pair and a cathode between said second capacitor and said second end of said primary winding of said second transformer; and
    a DIAC electrically connected between a gate of said SOR gate and a junction of said second resistor-capacitor pair.

13. The control device according to claim 12:
    wherein said resistor in said second resistor capacitor pair comprises a variable resistor;
    and wherein a frequency of a discharge of said first and second capacitors across said primary winding of said second transformer varies by adjustment of the resistance value of said variable resistor.

* * * * *